United States Patent Office 3,019,242
Patented Jan. 30, 1962

3,019,242
3,20-DIOXIMES OF 11-HYDROXY-
PROGESTERONES
William J. Wechter, Kalamazoo, Mich., assignor to The
Upjohn Company, Kalamazoo, Mich., a corporation of
Delaware
No Drawing. Filed July 1, 1960, Ser. No. 40,143
14 Claims. (Cl. 260—397.5)

This invention is concerned with novel 11-oxygenated steroid dioximes and more particularly with the 3,20-dioximes of 11α-hydroxyprogesterone and its 11-acylates, 11β-hydroxyprogesterone, the 9α-halo-11β-hydroxyprogesterones wherein the halogen is fluorine, chlorine, bromine or iodine, and processes for the production thereof.

The novel compounds and the process of the present invention are illustratively represented by the following formulae:

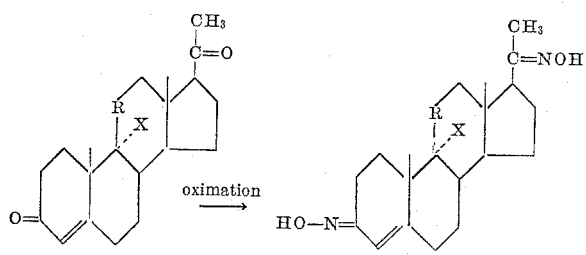

wherein R and X are selected from the combinations consisting of the combination R is

and X is selected from the group consisting of hydrogen, fluorine, chlorine, bromine and iodine, the combination R is

and X is hydrogen and the combination R is

and X is hydrogen wherein Ac is the acyl radical selected from hydrocarbon mono- and dicarboxylic acids having from 2 to 12 carbon atoms, inclusive, and carbamic acids having the formula

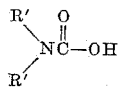

wherein R' is selected from the group consisting of hydrogen, alkyl radicals containing up to and including six carbon atoms, and phenyl.

The compounds of this invention occur in their 3-syn form, 3-anti form and as mixtures of these two isomers.

Illustratively, the dioxime of 11α-hydroxyprogesterone in the syn and anti-form has the following configuration:

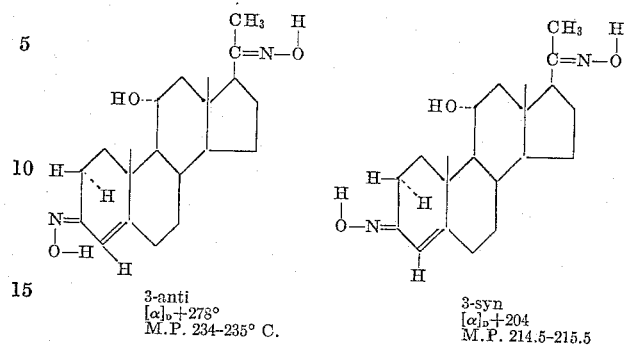

3-anti
$[\alpha]_D + 278°$
M.P. 234–235° C.

3-syn
$[\alpha]_D + 204$
M.P. 214.5–215.5

The oxime group on the 20-carbon atom is the anti-configuration in respect to the steroid nucleus.

In this specification and claims the terms HON= when attached to the 3-carbon atom denotes the 3-syn form, the 3-anti form and mixture thereof.

The compounds of the present invention, that is the dioximes of 11α-hydroxyprogesterone, 11β-hydroxyprogesterone, esters of 11α-hydroxyprogesterone and the 9α-halogen substituted compounds of 11β-hydroxyprogesterone are central nervous system depressants, useful as tranquilizers, muscle relaxants and sedatives in the treatment of hypertension, nervous disorders and related conditions in both valuable domestic animals and humans.

The compounds of the present invention can be prepared and administered to mammals, birds, humans, and animals in a wide variety of oral and parenteral dosage forms, singly or in a mixture with other coacting compounds. They can be associated with a carrier which can be a solid material or liquid, in which the compound is dissolved, dispersed or suspended. The solid composition can take the form of tablets, powders, capsules or the like, preferably in unit dosage forms for simple administration or precise dosages. To prepare tablets the following example is given:

Ten thousand scored tablets for oral use, each containing 500 mg. of an equilibrium mixture of 11α-hydroxyprogesterone 3,20-dioxime (the equilibrium mixture contains approximately two thirds in the syn form and one third in the anti-form), are prepared from the following ingredients:

| | Gm. |
|---|---|
| Equilibrium mixture of 3-syn and 3-anti dioxime of 11α-hydroxyprogesterone | 5000 |
| Starch U.S.P. | 350 |
| Talc U.S.P. | 250 |
| Calcium stearate | 35 |

The powdered active material is granulated with a 4% weight by volume aqueous solution of methylcellulose U.S.P. (1500 cps.). To the dried granules is added a mixture of the remainder of the ingredients and the final mixture compressed in tablets of the proper weight.

Using the same type of ingredients, tablets, pills, or capsules containing between 100 to 500 milligrams of active steroid dioximes can be prepared.

The liquid composition can take the forms of solutions, emulsions, suspensions, serums or elixirs.

A solution for oral use for house animals (dogs or cats) can be prepared with the following ingredients:

Equilibrium mixture of syn and anti-dioxime of
11α-hydroxyprogesterone _____ gm__ 50
Oil of orange _____ ml__ 1
Propylene glycol-glycerin (3:1) q.s. _____ ml__ 1000

The oil of orange and the equilibrium mixture of a 3-syn and 3-anti-dioxime of 11α-hydroxyprogesterone are dissolved with stirring in the propylene glycol-glycerin mixture and made up to volume. For mature beagles half to one milliliter is given three times a day to relieve conditions of anxiety and tension.

Instead of the equilibrium mixture or other mixtures the pure anti or the pure syn isomer of the 11α-hydroxyprogesterone dioxime may be used in such compositions. Similarly, the dioxime of 11β-hydroxyprogesterone, esters of 11α-hydroxyprogesterone dioxime and the dioximes of 9α-halo-11β-hydroxyprogesterone, especially the dioxime of 9α-fluoro-11β-hydroxyprogesterone can be substituted for the dioxime of 11α-hydroxyprogesterone in such therapeutic compositions.

The compounds of the present invention are prepared by reacting the substituted progesterones with hydroxylamine or hydroxylamine mineral acid salts such as hydroxylamine hydrochloride.

Starting materials for the present reaction are the known compounds 11α-hydroxyprogesterone, 11β-hydroxyprogesterone, esters of 11α-hydroxyprogesterone, wherein the acyl group on the 11-position is acetyl, propionyl, β-cyclopentylpropionyl, hemisuccinyl, diethylaminoacetyl, ethylcarbonyl, carbamyl, diethylcarbamyl and the like. Also 9α-bromo-, 9α-chloro-, 9α-fluoro- or 9α-iodo-11β-hydroxyprogesterone are useful as starting materials.

The process of the present invention comprises treating the selected substituted progesterone with either hydroxylamine or its mineral acid salt such as hydroxylamine hydrochloride or hydroxylamine sulfate in a suitable solvent such as an alkanol, for example methanol, ethanol, propanol, isopropanol, butanol or a tertiary amine for example pyridine, collidine, n,n-dimethylaniline and the like or preferably an alcohol in the presence of a base reagent such as a tertiary amine, sodium or potassium hydroxides, carbonates or acetates to give the corresponding dioxime of the substituted progesterone. This process is broadly referred to as oximation. An excess of hydroxylamine salt, usually from 2 to 6 molar equivalents is preferably employed. The preferred hydroxylamine mineral acid salt is hydroxylamine hydrochloride and the preferred basic reagent is pyridine. Alternatively, hydroxylamine itself can be used in place of the hydroxylamine salt and base.

The oximation reaction is preferably carried out at 20 to 120 degrees centigrade and conveniently at the reflux temperatures of the reaction mixture. Under this condition the reaction time is usually from 15 minutes to 48 hours. Both higher and lower temperatures and shorter and longer reaction times are operative. The lower temperature usually requires a corresponding longer reaction.

The reaction product thus obtained can be isolated from the reaction mixture by conventional methods for example, by pouring the reaction mixture into water and separating the resultant precipitate by filtration. Additional purification of the product can be accomplished by conventional methods for example by recrystallization from suitable solvents or a mixture of solvents such as methanol, dilute methanol, ethanol, isopropanol, ether, methylene chloride, methylene chloride Skellysolve B (hexanes) and the like.

The mixtures of syn and anti isomers obtained as above or by equilibration of the above product can be separated by procedures known in the art for separating geometrical isomers, for example by fractional crystallization, chromatography, selective leaching, or a combination of these methods.

EXAMPLE 1

*11α-hydroxyprogesterone dioxime*

A solution was prepared containing 100 grams of 11α-hydroxyprogesterone, 50 grams of hydroxylamine hydrochloride, 50 ml. of pyridine and 250 ml. of ethyl alcohol. This mixture was heated to reflux for three hours and then allowed to stand overnight at room temperature. The thus obtained suspension was poured into 2 liters of water and refrigerated. A material precipitated which was recovered by filtration, washed with water and dried in a vacuum oven giving 137 grams of crude oxime. This material was introduced in hot methanol wherein the majority of material dissolved.

The insoluble material, separated by filtration, weighed 5.7 g.

Four grams (from the 5.7 grams above) was dissolved in 75 milliliters of boiling methanol. To this solution was added a few drops of water which caused precipitation of a crystalline solid. This process was repeated twice yielding colorless crystalline 11α-hydroxyprogesterone dioxime in its anti-form of melting point 234 to 235.5° C.;

$\lambda_{max.}^{EtOH}$ 242 millimicrons (16,500)

Rotation $[\alpha]_D$ in pyridine +278 degrees. Infrared quantitative analysis showed 92% anti-form and 8% syn form.

*Analysis.*—Calcd. for $C_{21}H_{32}O_3N_2$: N, 7.77. Found: N, 7.62.

Further recrystallization from methanol gives the pure anti-isomer.

The hot methanol solution (filtrate) was diluted with water to give an amorphous precipitate of 83.9 grams consisting mostly of 11α-hydroxyprogesterone dioxime in the syn form. Ten grams of this material was suspended in 300 milliliters of methylene chloride and adsorbed on 130 grams of Florisil. The Florisil column was then eluted with a mixture of 25% acetone, 75% Skellysolve B hexanes and the thus-obtained eluate was evaporated to dryness, giving a solid which was crystallized from methanol and water to yield colorless needles of melting point 209.0 to 211.5. Two additional recrystallizations of this material afforded 3.1 grams of the 3-syn isomer of 11α-hydroxyprogesterone dioxime of melting point 214.5 to 215.5 degrees, rotation $[\alpha]_D$ +204 degrees, $\lambda_{max.}^{EtOH}$ 241 millimicrons (22,300)

*Analysis.*—Calcd. for $C_{21}H_{32}O_3N_2$: C, 69.97; H, 8.95; N, 7.77. Found: C, 70.16; H, 9.10; N, 7.62.

Equilibrium mixture: A sample of either 3-syn or 3-anti-isomer above, dissolved in pyridine (1% solution), gave after 40 hours, an equilibrium mixture which was established by quantative infra-red, nuclear magnetic resonance, ultra violet and rotation analysis to consist of 66±2% of the 3-syn isomer and 33±2% of the 3-anti isomer of 11α-hydroxyprogesterone 3,20-dioxime.

The syn, the anti, and all of the syn-anti mixtures showed activity as tranquilizers; both on oral and parenteral administration.

EXAMPLE 2

*9α-fluoro-11β-hydroxyprogesterone dioxime*

Two grams of 9α-fluoro-11β-hydroxyprogesterone were dissolved in a mixture of 10% methanol and 90% of 95% ethanol, 5% water (20 ml., 3A–alcohol) and thereto was added 11 grams of hydroxylamine hydrochloride and 1.5 g. sodium acetate and 5 ml. of water. This mixture was heated to reflux for a half hour and then treated as shown in Example 1. Recrystallization of this material from acetone-water yielded 2.3 grams of short fine needles. These needles were crystallized twice to give a precipitate of melting point 233 to 241 degrees which was recrystallized to give material of melting point 139 to 145.5 degrees.

$\lambda_{max.}^{EtOH}$ 239 millimicrons (18,900)

The infrared spectrum was characteristic of an acetone solvate of the desired oxime. Drying at 80–120° C. under diminished pressure gave the solvent free steroid, 9α-fluoro-11β-hydroxyprogesterone dioxime, which had the following analysis:

*Analysis.*—Calcd. for $C_{21}H_{31}O_3N_2F$: C, 66.67; H, 8.26; N, 7.40; F, 5.02. Found: C, 67.04; H, 8.92; N, 7.03; F, 4.6.

Crude material thus obtained from the reaction of 9α-fluoro-11β-hydroxyprogesterone and hydroxylamine was separated into 3-syn and 3-anti isomers of 9α-fluoro-11β-hydroxyprogesterone dioxime by fractional crystallization from aqueous methanol. The 3-syn isomer had a higher ultraviolet absorption coefficient in the 238–241 millimicron region than the 3-anti isomer.

Alternatively chromatography over Florisil anhydrous magnesium silicate using increasing proportions of acetone in hexanes for elution can also be used to separate the 3-syn-isomer from the 3-anti-isomer of 9α-fluoro-11β-hydroxyprogesterone dioxime.

Syn and anti-forms of 9α-fluoro-11β-hydroxyprogesterone dioxime can be used in any combined mixtures, if so desired.

EXAMPLE 3

*11β-hydroxyprogesterone dioxime*

In the same manner as described in Example 2, five grams of 11β-hydroxyprogesterone in 20 milliliters of 3A-alcohol was reacted with hydroxylamine hydrochloride to give a solid of 5 grams of colorless prisms from acetone. Recrystallization from acetone yielded a solvated form of 11β-hydroxyprogesterone dioxime melting between 130 and 160 degrees and after resolidifying melting at 240 to 248 degrees with decomposition. Drying between 80–120° C. under reduced pressure produced the solvent-free 11β-hydroxyprogesterone dioxime.

*Analysis.*—Calcd. for $C_{21}H_{32}O_3N_2$: C, 69.97; H, 8.95; N, 7.77. Found: C, 69.86; H, 9.02; N, 7.50.

The motor activity assays (see Deros, P. B., British J. Pharmacol. 8, 46 1953) with this material showed it particularly effective in tranquilizing mice for significantly long duration. 3-syn and 3-anti-forms of this material can be separated from each other as in Example 2, by fractional crystallization or chromatography or both.

EXAMPLE 4

*9α-bromo-11β-hydroxyprogesterone-dioxime*

In the same manner given in Example 1 treating 9α-bromo-11β-hydroxyprogesterone with hydroxylamine sulfate in ethyl alcohol containing methanol and in the presence of collodine at room temperature, for about 24 hours, produced a 9α-bromo-11β-hydroxyprogesterone dioxime.

EXAMPLE 5

*9α-iodo-11β-hydroxyprogesterone-dioxime*

In the same manner as given in Example 4 submitting to oximation 9α-iodo-11β-hydroxyprogesterone resulted in the production of 9α-iodo-11β-hydroxyprogesterone dioxime.

EXAMPLE 6

*9α-chloro-11β-hydroxyprogesterone dioxime*

In the same manner given in Example 4, subjecting to oximation 9α-chloro-11β-hydroxyprogesterone, dissolved in ethanol, in the presence of methanol, pyridine and hydroxylamine hydrochloride, resulted in the production of 9α-chloro-11β-hydroxyprogesterone dioxime.

EXAMPLE 7

*11α-hydroxyprogesterone 11-acetate dioxime*

Ten grams of 11α-hydroxyprogesterone 11-acetate was reacted with 5 grams of hydroxylamine hydrochloride in a solution consisting of 50 milliliters of ethanol containing ten milliliters of pyridine. The mixture was refluxed for 18 hours on a steam bath. Approximately one-half of the solvent was removed under reduced pressure and the remainder poured onto 400 milliliters of water. The solid which resulted was recrystallized several times with ethyl acetate to give a mixture of the 3-syn and the 3-anti-forms of 11α-hydroxyprogesterone 11-acetate dioxime.

Separation of the syn and the anti-forms, is accomplished by fractional crystallization or chromatography as described in Example 2.

EXAMPLE 8

*11α-hydroxyprogesterone 11-propionate dioxime*

In the same manner as shown in Example 7 11α-hydroxyprogesterone 11-propionate is converted by oximation to the 11α-hydroxyprogesterone 11-propionate dioxime.

In the same manner as shown in Example 7 the 3-syn and 3-anti-forms of 11α-hydroxyprogesterone 11-propionate dioxime can be isolated from the thus obtained mixture, by the difference in solubility of the anti-form and syn form in methanol-water solutions.

EXAMPLE 9

*11α-hydroxyprogesterone 11-benzoate-dioxime*

In the same manner as shown in Example 7 treating 11α-hydroxyprogesterone 11-benzoate with hydroxylamine sulfate in ethanol in the presence of collidine produces the corresponding 11α-hydroxyprogesterone 11-benzoate dioxime.

EXAMPLE 10

In the same manner given in Example 7, heating in a mixture of 10% methanol, 90% ethanol, hydroxylamine hydrochloride and pyridine:

(a) 11α-hydroxyprogesterone 11-butyrate yields 11α-hydroxyprogesterone 11-butyrate dioxime;

(b) 11α-hydroxyprogesterone 11-valerate yields 11α-hydroxyprogesterone 11-valerate dioxime;

(c) 11α-hydroxyprogesterone 11-hexanoate yields 11α-hydroxyprogesterone 11-hexanoate dioxime;

(d) 11α-hydroxyprogesterone 11-octanoate yields 11α-hydroxyprogesterone 11-octanoate dioxime;

(e) 11α-hydroxyprogesterone 11-decanoate yields 11α-hydroxyprogesterone 11-decanoate dioxime;

(f) 11α-hydroxyprogesterone 11-laurate yields 11α-hydroxyprogesterone 11-laurate dioxime;

(g) 11α-hydroxyprogesterone 11-(β-cyclopentylpropionate) yields 11α-hydroxyprogesterone 11-(β-cyclopentylpropionate) dioxime;

(h) 11α - hydroxyprogesterone 11 - toluenesulfonate yields 11α-hydroxyprogesterone 11-toluenesulfonate dioxime;

(i) 11α - hydroxyprogesterone 11 - methanesulfonate yields 11α-hydroxyprogesterone 11-methanesulfonate dioxime;

(j) 11α-hydroxyprogesterone 11-phenylacetate yields 11α-hydroxyprogesterone 11-phenylacetate dioxime;

(k) 11α - hydroxyprogesterone 11 - phenylpropionate yields 11α-hydroxyprogesterone 11-phenylpropionate dioxime.

EXAMPLE 11

*11α-hydroxyprogesterone 11-hemisuccinate dioxime and sodium salt thereof*

To a solution of 11α-hydroxyprogesterone in pyridine was added succinic anhydride. The mixture was allowed to stir at room temperature for a period of fifty hours. The reaction mixture was poured into 10 volumes of water and the product thus obtained separated by filtration. This material was once recrystallized from alcohol-water.

The thus obtained material was dissolved in ethanol, a small amount of pyridine was added followed by hydroxylamine hydrochloride. After refluxing overnight for a period of twenty hours the mixture was submitted to the same procedure as in Example 1 to give 11α-hydroxyprogesterone 11-hemisuccinate dioxime.

To a sodium hydroxide solution, 0.1 normal, was slowly added a stirred solution of two grams of 11α-hydroxyprogesterone 11-hemisuccinate dioxime contained in 50 milliliters of acetone, until the pH rose to 7.4. During the addition of the sodium hydroxide solution 100 milliliters of water was also added.

The solution was thereupon concentrated at 25 degrees centigrade under vacuum to remove the acetone. The resulting aqueous solution of 11α-hydroxyprogesterone 11-hemisuccinate sodium salt dioxime was filtered, freeze-dried to give 11α-hydroxyprogesterone 11-hemisuccinate sodium salt dioxime. Additional purification can be effected by recrystallization from aqueous ethanol.

EXAMPLE 12

*11α-hydroxyprogesterone 11-hemi-(β,β-dimethylglutarate)dioxime*

In the same manner as shown in Example 11 the 11α-hydroxyprogesterone 11 - hemi-(β,β-dimethylglutarate)dioxime can be prepared by oximating 11α-hydroxyprogesterone 11-hemi-(β,β-dimethylglutarate) (prepared from 11α-hydroxyprogesterone, β,β-dimethylglutaric anhydride and a small amount of pyridine) by oximation as shown in the prior examples.

Titrating a solution of 11α-hydroxyprogesterone 11-hemi-(β,β-dimethylglutarate)dioxime in acetone solution in the presence of water with aqueous sodium hydroxide until the pH goes up to about 7.3 to 7.5 permits the production of the sodium salt of 11α-hydroxyprogesterone 11-hemi-(β,β-dimethylglutarate)dioxime.

EXAMPLE 13

*11α-hydroxyprogesterone-11-carbamate dioxime*

Phosgene gas was passed into a solution of 10.66 grams of 11α-hydroxyprogesterone, dissolved in 100 milliliters of methylene chloride, for a period of two hours. Excess phosgene and some of the solvent were removed at reduced pressure at a bath temperature from 20 to 25 degrees. The residual oil, 11-chloroformate of 11α-hydroxyprogesterone, was dissolved in 100 milliliters of methylene chloride. Gaseous ammonia was passed into the solution for a period of one hour after which the precipitated ammonium chloride was filtered off. The filtrate was partially boiled down and then diluted with excess Skellysolve B hexane solution. A crystalline product, 11α-hydroxyprogesterone 11-carbamate, precipitated, of melting point 204 to 211 degrees and yield 5.8 grams.

A solution was prepared of 14.2 grams of 11α-hydroxyprogesterone 11-carbamate, 7 grams of hydroxylamine hydrochloride, 15 milliliters of pyridine and 100 milliliters of alcohol. The mixture was heated to reflux for 18 hours on a steam bath. Approximately one half of the solvent was thereupon removed under reduced pressure and the solution diluted with water to give an amorphous solid. This solid was recovered by filtration and after drying yielded 10.7 grams of crude 11α-hydroxyprogesterone 11-carbamate dioxime. After two recrystallizations of this material from ethyl acetate the melting point range was 160 to 180 degrees indicating clearly the presence of more than one isomer. λ maximum values are as follows: 3300, 3200, 1720 sh., 1695, 1642, 1635, 1000, 1050, 960, 940 and 910 cm.$^{-1}$ $\lambda_{max.}^{EtOH}$ 240 m$\mu$ ($\epsilon$=19,100)

EXAMPLE 14

*11α-hydroxyprogesterone 11-diethylcarbamate dioxime*

In the same manner as given in Example 13 the 11-chloroformate of 11α-hydroxyprogesterone is reacted with gaseous diethyl amine. The obtained product diethylcarbamate of 11α-hydroxyprogesterone is thereupon refluxed with hydroxylamine hydrochloride in the presence of pyridine in ethanol solution.

A mixture of 11α-hydroxyprogesterone 11-diethylcarbamate dioxime is obtained consisting in the syn and anti-forms. The separation of the isomers can be made as indicated in Example 1.

EXAMPLE 15

*11α-hydroxyprogesterone 11-methylcarbonate dioxime*

Two grams of 11α-hydroxyprogesterone ethylene bisketal, 5-milliliters of dimethyl carbonate and a solution of 1-milliliter of methanol containing 25 milligrams of sodium hydroxide was refluxed for a period of 6 hours. The solution was neutralized after cooling by addition of dilute aqueous hydrochloric acid. The solution was thereupon filtered, evaporated to a small volume, diluted with 20 milliliters of alcohol and then poured into fifty milliliters of ice water. The precipitated material and oils were extracted with methylene chloride, the methylene chloride extracts dried, and evaporated to dryness. The thus obtained material, a mixture of 11α-hydroxyprogesterone 11-methylcarbonate and its bisketal was heated in ethanol solution with hydroxylamine and pyridine on the steam bath for four hours to give a mixture of 3-syn and 3-anti 11α-hydroxyprogesterone 11-methylcarbonate dioxime.

In the same manner given in Examples 13 through 15 other alkyl carbamates and alkyl carbonates of 11α-hydroxyprogesterone dioxime are produced by converting 11α-hydroxyprogesterone to the corresponding esters and using the oximation procedure of Example 13. Representative compounds thus obtained include 11α-hydroxyprogesterone 11-dipropylcarbamate dioxime 11α-hydroxyprogesterone 11-dibutylcarbamate dioxime, 11α-hydroxyprogesterone dipentylcarbamate dioxime, 11α-hydroxyprogesterone 11-dihexylcarbamate dioxime, 11α-hydroxyprogesterone diphenylcarbamate dioxime, 11α-hydroxyprogesterone 11-ethylcarbonate dioxime, 11α-hydroxyprogesterone 11-propylcarbonate dioxime, 11α-hydroxyprogesterone 11-butylcarbonate dioxime and the like.

I claim:

1. Substituted progesterone 3,20-dioximes of the formula:

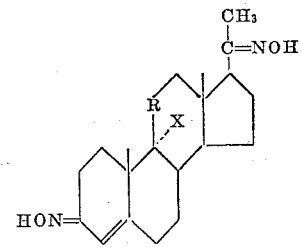

wherein R and X are selected from the combinations consisting of the combination R is

and X is selected from the group consisting of hydrogen, fluorine, chlorine, bromine and iodine, the combination R is

and X is hydrogen and the combination R is

and X is hydrogen wherein Ac is the acyl radical selected from the group consisting of hydrocarbon mono-and di-carboxylic acids having from 2 to 12 carbon atoms, inclusive, and carbamic acids having the formula:

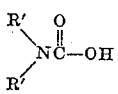

wherein R' is selected from the group consisting of hydrogen and alkyl radicals containing up to and including six carbon atoms, and phenyl.

2. 11α-hydroxyprogesterone dioxime.
3. The 3-syn isomer of 11α-hydroxyprogesterone dioxime of formula:

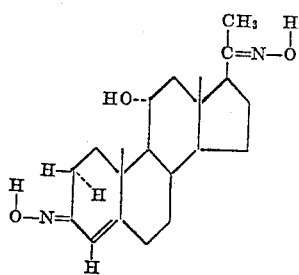

4. The 3-anti isomer of 11α-hydroxyprogesterone dioxime of formula:

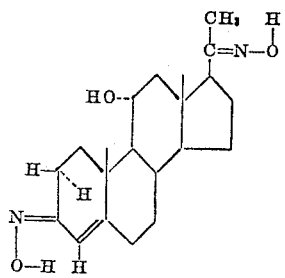

5. 11β-hydroxyprogesterone dioxime.
6. 9α-fluoro-11β-hydroxyprogesterone dioxime.
7. 11α - hydroxyprogesterone 11 - acylates dioximes wherein the acyl group is of a hydrocarbon monocarboxylic acid containing from 2 to 12 carbon atoms, inclusive.
8. 11α-hydroxyprogesterone 11-acetate dioxime.
9. 11α-hydroxyprogesterone 11-acylate dioxime wherein the acyl group is of a hydrocarbon dicarboxylic acid containing up to and including 12 carbon atoms, inclusive.
10. 11α-hydroxyprogesterone 11-hemisuccinate dioxime.
11. The sodium salt of 11α-hydroxyprogesterone 11-hemisuccinate dioxime.
12. 11α-hydroxyprogesterone 11-carbamate dioxime.
13. The equilibrium mixture of the 3-syn and 3-anti isomer of 11α-hydroxyprogesterone dioxime.
14. A mixture of the 3-syn and 3-anti isomer of 11α-hydroxyprogesterone dioxime.

References Cited in the file of this patent
UNITED STATES PATENTS
2,628,966    Graber et al. _____ Feb. 17, 1953
OTHER REFERENCES
Oliveto et al.: J.A.C.S. 78, 1736–1738 (1956).